United States Patent [19]

Hoendervoogt et al.

[11] Patent Number: 5,124,509
[45] Date of Patent: Jun. 23, 1992

[54] DIGITIZER WITH CAPACITIVE AND INDUCTIVE COUPLING

[75] Inventors: Jason Hoendervoogt; James Watson, both of Phoenix, Ariz.

[73] Assignee: Calcomp, Inc., Anaheim, Calif.

[21] Appl. No.: 643,576

[22] Filed: Jan. 15, 1991

[51] Int. Cl.$^5$ .............................................. G08C 21/00
[52] U.S. Cl. ...................................................... 178/19
[58] Field of Search ...................................... 178/19, 18

[56] References Cited

U.S. PATENT DOCUMENTS

| | | | |
|---|---|---|---|
| 3,732,369 | 5/1973 | Cotter | 178/18 |
| 3,767,858 | 10/1973 | Rodgers | 178/18 |
| 4,022,971 | 5/1977 | Rodgers | 178/19 |
| 4,210,775 | 7/1980 | Rodgers et al. | 178/19 |
| 4,423,286 | 12/1983 | Bergeron | 178/19 |
| 4,661,656 | 4/1987 | Rodgers et al. | 178/18 |
| 4,692,568 | 9/1987 | Morita | 178/19 |
| 4,734,546 | 5/1988 | Landmeier | 178/19 |
| 4,831,216 | 5/1989 | Landmeier | 178/19 |
| 5,007,085 | 4/1991 | Greanios et al. | 178/18 |

*Primary Examiner*—Stafford D. Schreyer
*Attorney, Agent, or Firm*—Cesari and McKenna

[57] ABSTRACT

A battery powered oscillator in a freely movable pointer drives a coil and a divider. A grid of spaced conductors in a base unit is inductively coupled to the coil. A conductive plate that lies parallel to the conductor grid capacitively couples the signal from the divider to a phase locked loop to provide a reference signal that has a constant phase in relation to the oscillator. Detection circuitry uses the signals induced in selected grid conductors and the phase reference signal to determine the location of the pointer relative to the conductors. As an alternative to the phase locked loop, the signal induced in an idle reference conductor can be combined with the capacitively coupled reference signal to aid in demodulating the induced signals. As an alternative to an oscillator in the pointer, the coil may be driven by a signal capacitively coupled from the base unit.

36 Claims, 4 Drawing Sheets

DIGITIZER WITH CAPACITIVE AND INDUCTIVE COUPLING

FIELD OF THE INVENTION

This invention relates to graphic digitizers, that is, systems for translating the physical position of a pointer relative to a grid of spaced conductors into electrical signals for use by a utilization device. More particularly, it relates to a digitizer system having a cordless pointer.

BACKGROUND

Digitizers, as known in the art, are very useful for translating the position of an item in a plan or drawing into coordinates recognizable by a computer. In the latter form, the computer can make use of the position information in any number of useful ways. Unlike the position information from a mouse, which is always relative to its immediately previous position on a support surface, the digitizer position information is relative to a grid of conductors incorporated into its work surface. It becomes, therefore, absolute with respect to the work surface and any plan or drawing mounted thereon in a designated orientation. As a result, the position information is accurate enough not only to edit graphic displays, but also to control manufacturing processes according to scale drawings placed on the work surface, and to control navigation of air and water craft according to charts.

A number of well known digitizer systems make use of a movable coil and a work surface defined by a grid of conductors. The coil may be disposed within the tip of a pen-shaped instrument so that the pen point accurately locates the effective coil center. Alternatively, the coil may surround a transparent disc with a set of cross hairs etched thereon to mark the coil center in what is known as a cursor. The grid normally comprises a set of parallel conductors spaced along the work surface in what may be called the x direction and another set similarly disposed along the work surface in the orthogonal y direction. An oscillator applies an ac signal of predetermined frequency and amplitude to the coil, which is inductively coupled to the conductors of the grid.

In accordance with the principles of well known electromagnetic theory, ac electrical signals are induced in the grid conductors at a magnitude and phase that depend on the location of the coil relative to the conductors. Generally, the signals induced in the conductors will have a magnitude that varies from zero at the coil center to a maximum at the coil periphery and tapering off beyond. Further, the phase of the signals induced in conductors at one side of the coil will be the opposite of (180 degrees displaced from) that of signals induced in conductors at the other side. Both of these properties are used to advantage in several known digitizers.

In the digitizer disclosed in U.S. Pat. No. 4,423,286, that issued to Gary A. Bergeron Dec. 12, 1983, individual conductors are selectively connected, one at a time, through the use of multiplexer circuitry, to detection circuitry that determines both the phase and the magnitude of the signal induced in the selected conductor. When a conductor of the x set is selected by the multiplexer circuitry, the phase of the induced signal indicates whether the pointer is to the right or to the left of the selected conductor. By first selecting a conductor at the center of the work surface, the Bergeron apparatus determines whether the pointer is on the right half or the left half of the surface. A conductor near the center of the indicated half is next selected to determine the quarter of the work surface on which the pointer is located. Successive conductors are similarly selected in a logical progression to very quickly identify the two adjacent conductors in which the induced signals are of opposite phase, indicating that the pointer is located between them. The precise position of the pointer between the identified adjacent conductors is then determined by the relative magnitudes of induced signal in the identified conductors.

In other digitizers, such as that described in U.S. Pat. No. 4,734,546, that issued to Waldo L. Landmeier Mar. 29, 1988, each conductor is looped through several areas of the work surface to reduce the number of conductors in each grid set. Looping, of course, generates segments of each conductor in which the direction across the work surface of a continuous conductor current is reversed. These segment direction reversals are observed by the detecting circuitry as phase reversals of the induced signal. Each conductor is looped in a different manner so that, in each work surface area, the combination of conductor segment directions is unique. Since the phase of the signals induced in all conductor segments to one side of the pointer is the same, the pattern of observed phase reversals among the combination of conductors is used to uniquely identify the particular area of the work surface on which the pointer coil is located. Phase reversals due to segment loop direction are then compensated for, and pointer location within the area proceeds normally.

One disadvantage of these known digitizer systems is the electrical cable that normally carries the ac signal to the coil. Such cables tether the pointer to the base electronics and restrict free movement of the pointer across the digitizer work surface. The oscillator can, of course, be located in the pointer together with a battery for power. A shortcoming of this arrangement until now, however, has been that the oscillator phase reference needed for these improved systems would normally be lost.

An object of the present invention is to provide a digitizer system having an untethered pointer that provides an oscillator phase reference signal to the receiving circuitry.

SUMMARY OF THE INVENTION

A digitizer system embodied in accordance with the present invention utilizes a grid of spaced conductors in a base unit and a movable pointer comprising coil means for inductively coupling an ac signal between the coil means and the conductors. Phase reference means comprising a capacitive coupling circuit between the base u it and the pointer provides a phase reference signal that has a constant phase in relation to the ac signal at all pointer locations. Detecting means detects the signals induced in selected ones of the conductors by the coil means and determines the location of the pointer relative to the conductors in response to the induced signals and the phase reference signal.

The phase reference means may include a conductive plate of controlled resistivity, parallel to the grid conductors, to facilitate the capacitive coupling and a phase locked loop to reduce phase jitter. To reduce noise, the capacitively coupled signal may be a submultiple of the ac signal produced by a divider within the pointer. The complete circuit of the phase reference signal then may be traced from the phase locked loop through the conductive plate, the pointer ground, the ac signal source, the divider, and the hand and body of the operator to system ground. The ac signal may be generated by an oscillator in the pointer or may be derived from a signal originating in the base unit and capacitively coupled to the pointer.

Alternatively, the electromagnetic signal induced in a conductor of an idle grid may be combined with the phase reference signal to aid in demodulating the locating signal.

DRAWING DESCRIPTION

The foregoing and other features and advantages of this invention will be better understood from the following detailed description taken with the accompanying drawings in which.

DETAILED DESCRIPTION

Figure 1:
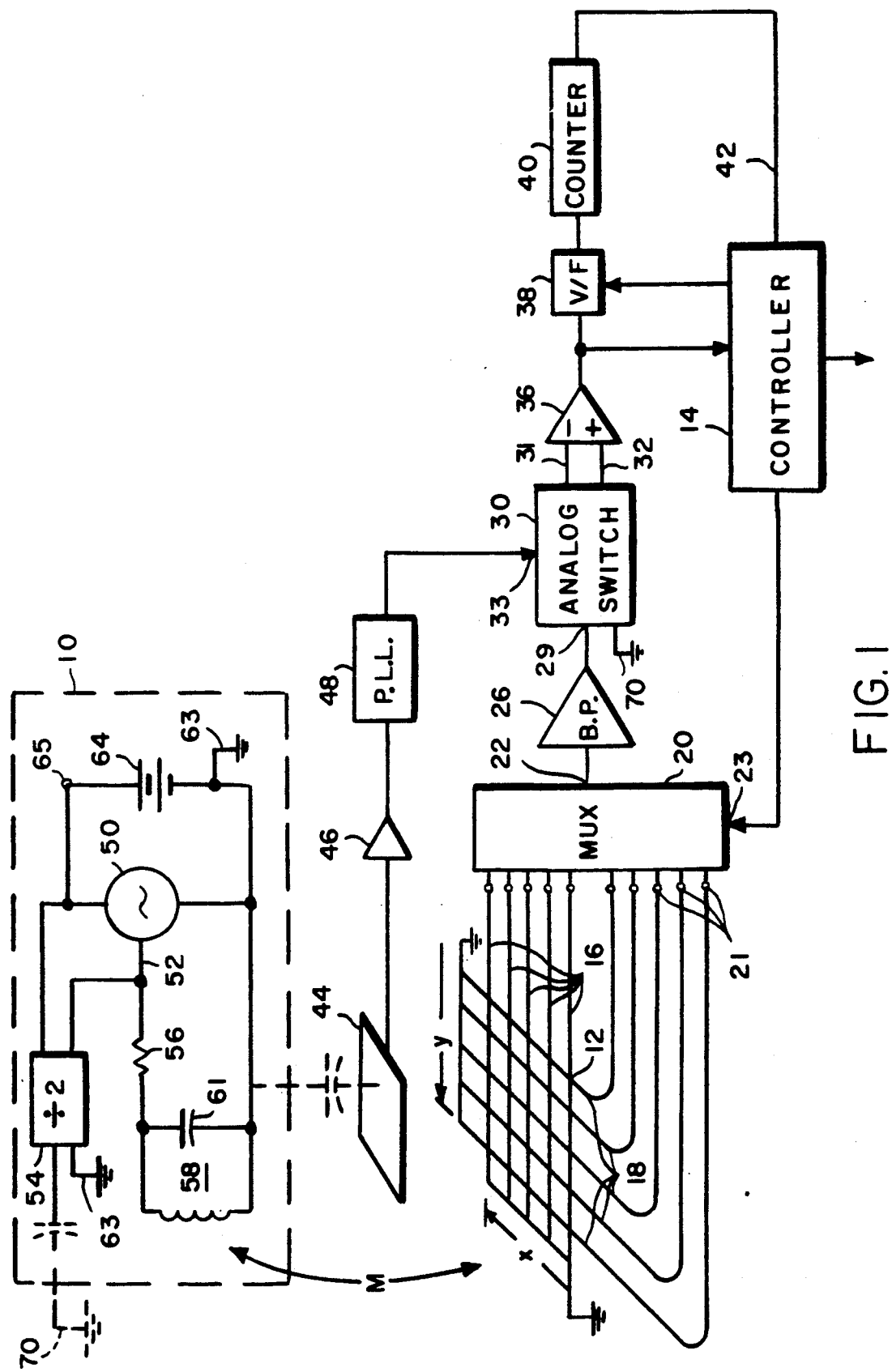
FIG. 1 is a partly block diagrammatic and partly schematic illustration of a particularly useful embodiment of the invention.

In an exemplary embodiment of the invention, shown in FIG. 1, the position of an untethered pointer 10, in relation to a grid of conductors 12 located in a base unit 9, is determined by a process under the control of a controller 14. Grid 12 may typically have a set of spaced parallel conductors 16 extending in an x direction and a similar set of spaced parallel conductors 18 extending in a y direction, orthogonal to x. These x and y conductors are in planes parallel to and slightly below the digitizer work surface of base unit 9. A switching multiplexer 20 has several signal inputs 21 connected to respective x conductors 16 and y conductors 18. Multiplexer 20 also has a signal output 22 and an address input 23. The particular signal input to which output 22 is connected is determined by the address on input 23. The signal output from multiplexer 20 may be connected through a bandpass amplifier 26 to the signal input 29 of an analog switch 30. In addition to its signal input, switch 30 has a pair of outputs 31 and 32 and a reference input 33. Switch 30 may be considered a double-pole double-throw reversing switch under control of reference input 33. One output is connected to system ground, and the other output is connected to signal input 29. When the polarity of the voltage on reference input 33 reverses, the connections to outputs 31 and 32 are interchanged, i.e., the output that was connected to ground is connected to input 29, and the output that was connected to input 29 is connected to ground. A differential amplifier 36 has its inverting and non-inverting inputs connected to analog switch outputs 31 and 32, respectively, and its output connected to a voltage to-frequency converter 38. A counter 40 connected to the output of converter 38 counts pulses for a predetermined period of time and sends its total to controller 14 over a digital bus 42. A conductive plate 44, which may be parallel to and between the work surface and grid 12, is connected through an amplifier 46 to a phase locked loop 48. The output of phase locked loop 48 is connected to reference input 33 of analog switch 30.

Pointer 10 in this embodiment includes the following circuitry: an oscillator 50 has its signal output 52 connected to a digital divider 54 and, via as isolating resistor 56 to a tuned circuit 58. Tuned circuit 58 includes the driving coil 60 and a capacitor 61, and is tuned to the frequency of oscillator 50. A pointer circuit ground 63 is common to all of this circuitry, and a battery 64 is connected between pointer circuit ground and a voltage supply terminal 65 to provide operating voltage to the active circuits, 50 and 54. The output of divider 54 and circuit ground 63 are capacitively coupled outside of pointer 10, as described below.

The embodiment illustrated by FIG. 1 operates to provide the advantages of the invention in the following manner: Oscillator 50 excites tuned circuit 58 to resonate at the oscillator frequency, which may be, for example, 115 KHz. The resulting current in coil 60 generates a 115 KHz. magnetic field coupled to the grid conductors 16 and 18 in the usual manner of electromagnetic coupled digitizers. Divider 54 generates a lower frequency signal that is a submultiple of the oscillator frequency. In this example, a divide-by-two circuit may generate a square wave at half the oscillator frequency, 57.5 KHz. The lower frequency signal is capacitively coupled via the hand and body of the operator to digitizer system ground 70, normally at earth ground. Since the lower frequency signal output occurs between earth ground and pointer ground 63, the entire pointer 10 follows the 57.5 KHz. square wave. Pointer circuit ground 63 is capacitively coupled to conductive plate 44 at all points on the work surface. The 57.5 KHz. square wave is therefore picked up by conductive surface 44 and amplified by amplifier 46. Whether the output of divider 54 is coupled to the operator's body and system ground, and the pointer ground 63 is coupled to conductive plate 44, or vice versa, is not crucial to the operation of the invention. It appears to be easier, however, to capacitively couple the mass locked loop 48 has its voltage controlled oscillator output operate at the frequency of oscillator 50, in this example 115 KHz., to provide a phase reference signal to analog switch 30. According to well known electrostatic theory, unlike magnetically coupled signals, capacitively coupled signals do not reverse in phase with position of the electrodes. The reference circuit that includes system ground 70, the body of the operator, divider 54, oscillator 50, pointer circuit ground 63, conductor plate 44, amplifier 46 and phase locked loop 48 therefore provides a reference signal that is constant in frequency and phase with respect to oscillator 50. Thus, in accordance with the principles of our invention, the embodiment of FIG. 1 may operate with its untethered pointer just as if the reference signal came via direct connection from the coil driving oscillator as in the prior art.

Controller 14 selects individual conductors of grid 12 by specific addresses into multiplexer address input 23. Multiplexer 20 connects the selected conductor to its output 22 to pass the signal induced in the selected conductor by the magnetic field of pointer coil 60 to bandpass filter 26 and analog switch 30. Filter 26, tuned to the frequency of oscillator 50, improves the signal-to-noise ratio. Switch 30 and differential amplifier 36 form a synchronous demodulator that produces a dc voltage output to voltage-to-frequency converter 38 for each selected conductor. Differential amplifier 36 could have a dual polarity output, in which case the polarity of the dc output signal indicates the phase of the signal induced in the selected conductor, and the magnitude of the dc output signal is proportional to the magnitude of the induced signal. More typically, if amplifier 36 has a single polarity output, the difference between the dc output and the zero signal output represents the magnitude, and the sign of the difference represents the phase of the induced signal. Converter 38 and counter 40, controlled by a timing signal from controller 14, form an effective analog-to-digital converter to provide to controller 14 digital representations of the induced signal magnitudes and phases on the selected conductors. Controller 14, therefore, quickly identifies the two conductors adjacent to the pointer, and using the two digital magnitudes, performs a ratio calculation or uses a look-up table to determine the precise pointer location as in the prior art.

It is important to note that conductive plate 44 should not be too highly conductive. A copper or aluminum plate, for example, by supporting high induced eddy currents, could effectively shield the grid conductors from the magnetic field set up by driving coil 60. We have found that a resistivity of about 15 milliohms per square produces very satisfactory results. This resistivity can be obtained by a silk screened layer of silver circuit paint approximately 0.0006 to 0.0007 inches thick on an insulator such as mylar. It should also be noted that divider 54, although very useful in reducing noise, is not indispensable to the invention. Further, as will be obvious to those of ordinary skill in the art, when a divider is used to provide the reference signal the division factor need not be two nor the output a square wave; capacitive coupling at the oscillator frequency or any submultiple thereof to phase locked loop 48 will provide a valid phase reference signal to obtain the advantages of the invention. The square waveform out of divider 54 is because of the nature of a digital divider and does not substantially affect the operation. Similarly, driving coil 60 can be satisfactorily driven directly by oscillator 50 without capacitor 61. The use of a tuned circuit 58, however, can substantially improve efficiency and battery life, particularly when oscillator 50 is a crystal oscillator. Alternatively, tuned circuit 58 may form part of oscillator 50.

Figure 2:
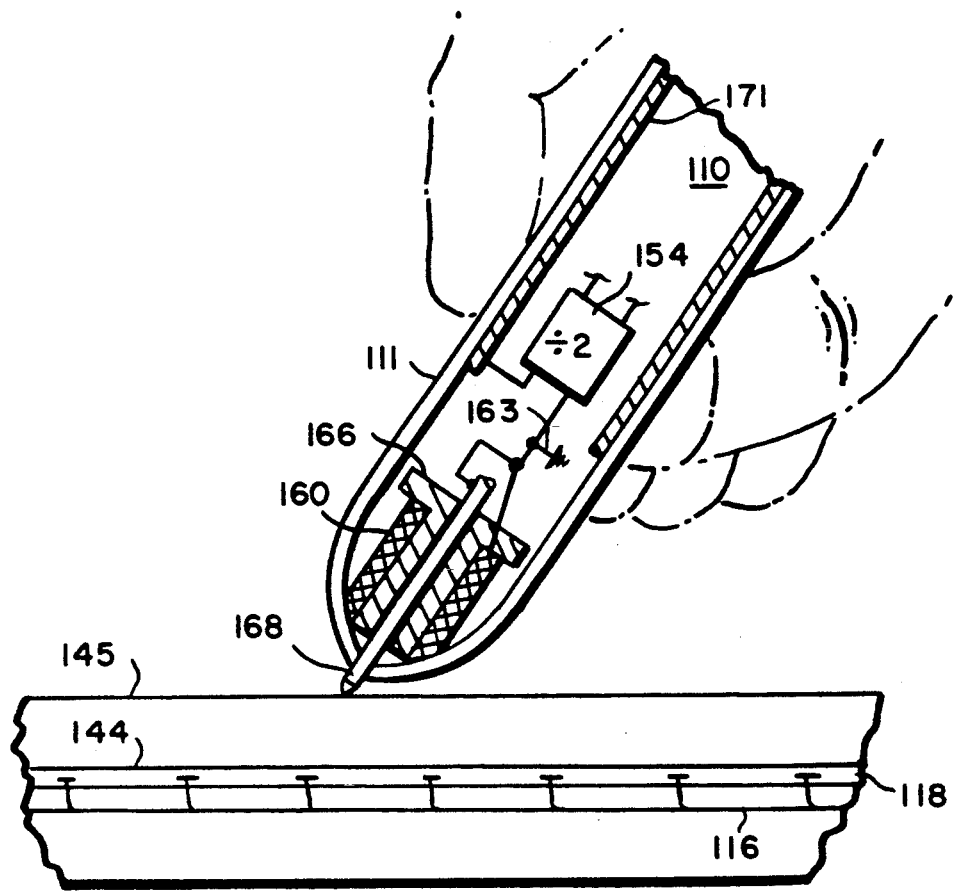
FIG. 2 is a cross-sectional view of a stylus type pointer useful in practicing the invention.

FIG. 2 shows some details of the construction of a stylus type pointer useful in practicing the invention For convenience, the components which are common to FIG. 1 are identified by the same two-digit numerals with the added prefix 1. The conductors 16 of the x grid, for example, are therefore labelled 116 in FIG. 2. Conductive plate 144 is located between the grid and the work surface 145, nearer the grid. All of the components of pointer 110 may be housed in a nonconducting pen shaped housing 111. A driving coil 160 having a core 166 of a suitable magnetic material such as, for example, ferrite, may be located in the bottom of housing 111. A metallic stylus point 168 may be inserted in the hollow center of core 166 and protrude through a tip opening in housing 111. In a system that digitizes hand written information, such as an electronic writing tablet, point 168 may be a ball point pen. A conductive coating or sleeve 171 may line the housing 111 in the section where it is grasped by the operator. The output of divider 154 is connected to sleeve 171, and pointer circuit ground 163 includes stylus point 168 in addition to the connections shown in FIG. 1. Other components have been left out of FIG. 2 for clarity; a designer of ordinary skill can readily select and arrange them within housing 111. Since sleeve 171 lines the area of housing 111 grasped by an operator, the output of divider 154 is strongly coupled to earth ground through the operator's body. Likewise, since point 168 and the lower end of coil 160 are electrically connected to pointer ground 163, the square wave generated by divider 154 is capacitively connected to conductive plate 144 when point 168 is on the digitizer work surface 145. At the same time the magnetic field generated by coil 160 and directed by core 166 penetrates conductive plate 144 to induce signals in grid conductors 116 and 118. Alternatively, since the divider output voltage is not dangerously high, sleeve 171 can be on the outside of housing 111, making direct conductive connection to the operator's hand.

Figure 3:
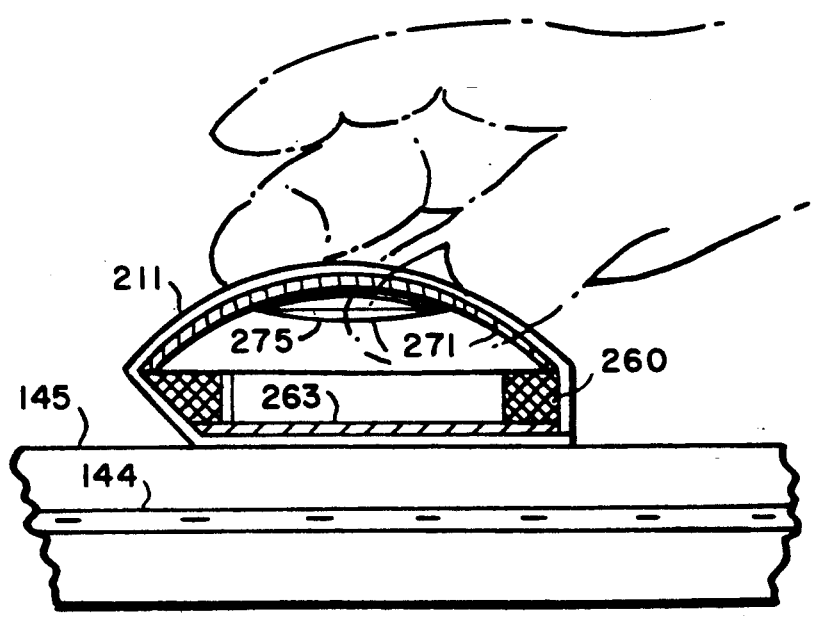
FIG. 3 is a cross-sectional view of a cursor type pointer useful in practicing the invention.

As shown in the cursor arrangement of FIG. 3 the pointer components may be mounted in a transparent, nonconductive dome-shaped housing 211. A magnifying lens 275, mounted in the center of the dome can assist the operator in accurately placing the cursor. A foil ring 271 lines the inside of the dome in the non-view area grasped by the operator to provide a capacitive connection to earth ground. As in the case of the stylus pointer of FIG. 2, ring 271 may be on the outside of the housing to provide a direct conductive coupling to the fingers of the operator. Coil 260 has an air core and is in general of larger diameter than coil 160 for effective magnetic coupling. Sighting of the target area can thereby be through the center of the coil. Cursor system ground may be connected to a conductive ring 263 to provide capacitive coupling of the lower frequency signal to conductive plate 244.

We have thus described a graphic digitizer system having a free, untethered pointer, but which nonetheless provides the phase reference information needed by advanced systems. The invention is, of course, not limited to the arrangement shown; many other arrangements are possible.

Figure 4:
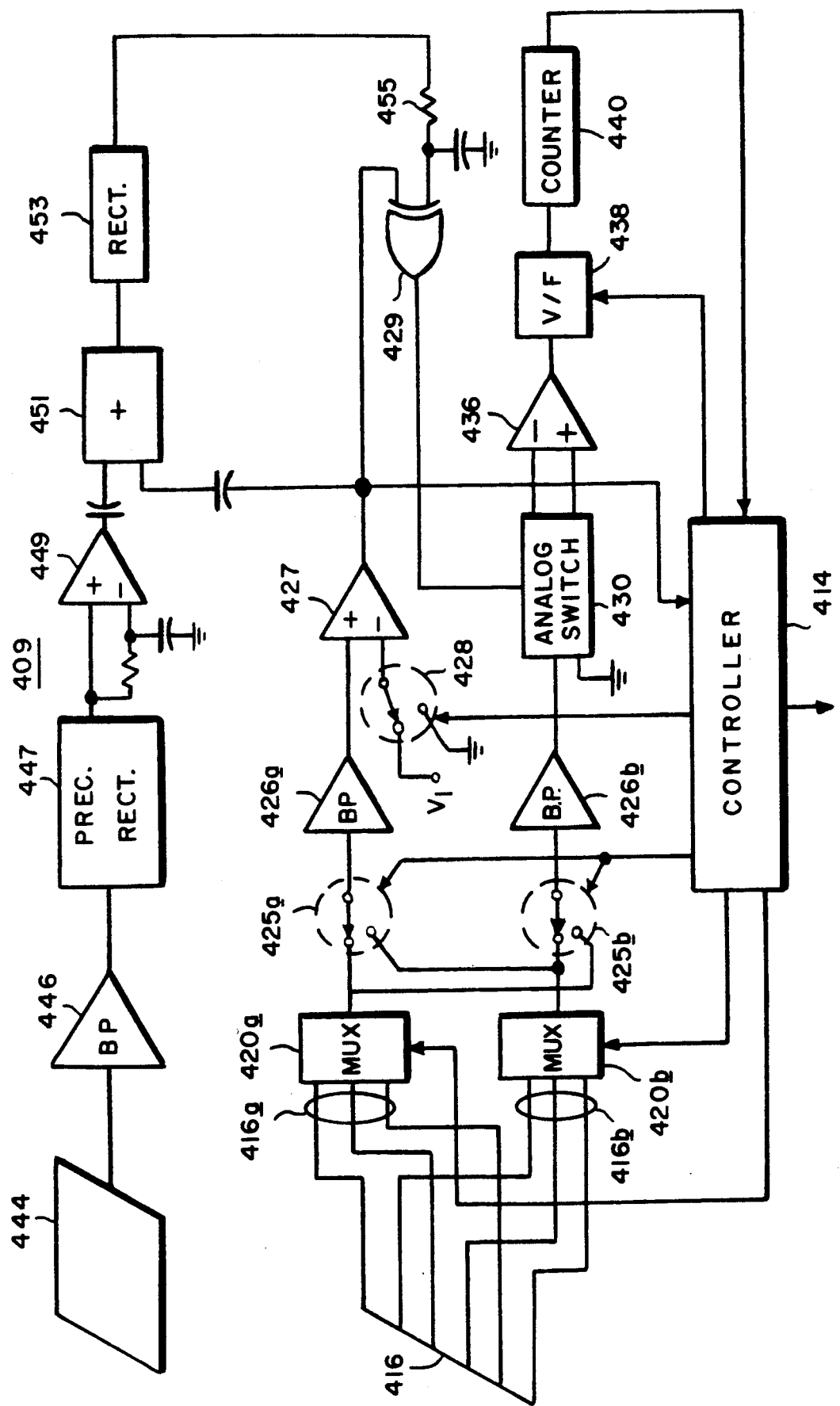
FIG. 4 is a partly block diagrammatic and partly schematic illustration of a base unit of an embodiment of the invention particularly useful in a noisy environment.

A base unit that may be substituted for base unit 9 of the embodiment of FIG. 1 to take advantage of digital techniques is shown in the partly block, partly schematic diagram of FIG. 4. In this base unit 409, x receiving grid 416 is split into two parts, 416a and 416b, each containing respective alternate wires. Even wires 416a are connected to "even" multiplexer 420a, and odd wires 416b to "odd" multiplexer 420b. The outputs of the multiplexers are connected to separate inputs of two switches. 425a and 425b, both under the control of controller 414. Alternate wires of the y grid may be similarly connected to a pair of multiplexers, in turn connected to the controlled switches. For the sake of clarity, however, the y grid and its connections have been omitted from the drawing. The outputs of the switches are connected to respective bandpass amplifiers 426a and 426b. The output of amplifier 426b connects to analog switch 430 in a manner similar to that of the embodiment of FIG. 1. The output of amplifier 426a drives one input of a comparator 427, the output of which is connected to controller 414 and to one input of an exclusive-or gate 429 that controls analog switch 430. The other input of comparator 427 is selectively connected by a switch 428 to either a reference voltage V1 or ground, also under control of the controller.

In this embodiment, the output of bandpass amplifier 446 connected to the electrostatic plate 444 is fed to a precision full wave rectifier 447. The output of the rectifier is fed directly to one input and through a lowpass filter to the other input of a comparator 449. The outputs of the two comparators are connected through respective blocking capacitors to an analog adder 451. Finally, the output of adder 451, after passing through a full wave rectifier 453 and a lowpass filter 455, is fed to the other input of exclusive-or gate 429.

With this very useful embodiment of the invention, the output of one multiplexer is used to help establish the reference signal to the synchronous demodulator while the output of the other multiplexer establishes location of the pointer in the usual manner. When switch 425b connects "odd" multiplexer 420b to amplifier 426b with the location signal, therefore, switch 425a connects "even" multiplexer 420a to amplifier 426a, as shown. As the pointer is moved to a new location on the work surface, switch 428 first connects comparator 427 to reference voltage V1, and controller 414 monitors the output of the comparator. A reference wire is selected by multiplexer 420a that has a sufficient induced voltage to serve as reference, as determined by comparison to voltage V1. Switch 428 then connects the comparator input to ground, producing an output square wave that mimics the zero crossings of the electromagnetic-induced reference signal and forms one input to the exclusive-or gate 429. At the same time, precision full wave rectifier 447 doubles the frequency of the electrostatic reference signal picked up on plate 444 to match that of the electromagnetic signal. The rectifier's slicing level can be adjusted to also produce a square wave. Comparator 449, by comparing the output of the precision rectifier to its dc value, makes the square wave output symmetrical about the zero axis. Adder 451 adds the square wave signals from the two comparators. If they are in phase, the sum, after rectification and filtering, presents a logical "1" to exclusive-or gate 429; if they are out of phase, a logical "0" is presented. A "0" has the effect of preserving and a "1" the effect of inverting the phase of the control signal from comparator 427 to analog switch 430. The remainder of the procedure for selecting the closest "odd" wire and determining the pointer location follows as described before, with the exception that the polarity of the signal from comparator 427 indicates to the controller whether or not the pointer is between the reference conductor and the selected "odd" wire.

This procedure using digital signals to control the analog switch has produced a more accurate pointer location in the presence of considerable noise. It will perhaps be obvious to the reader that the x and y multiplexers may be used in the manner described instead of separate "odd" and "even" multiplexers, the normally idle one taking the place of the "even" multiplexer in the foregoing description.

Figure 5:
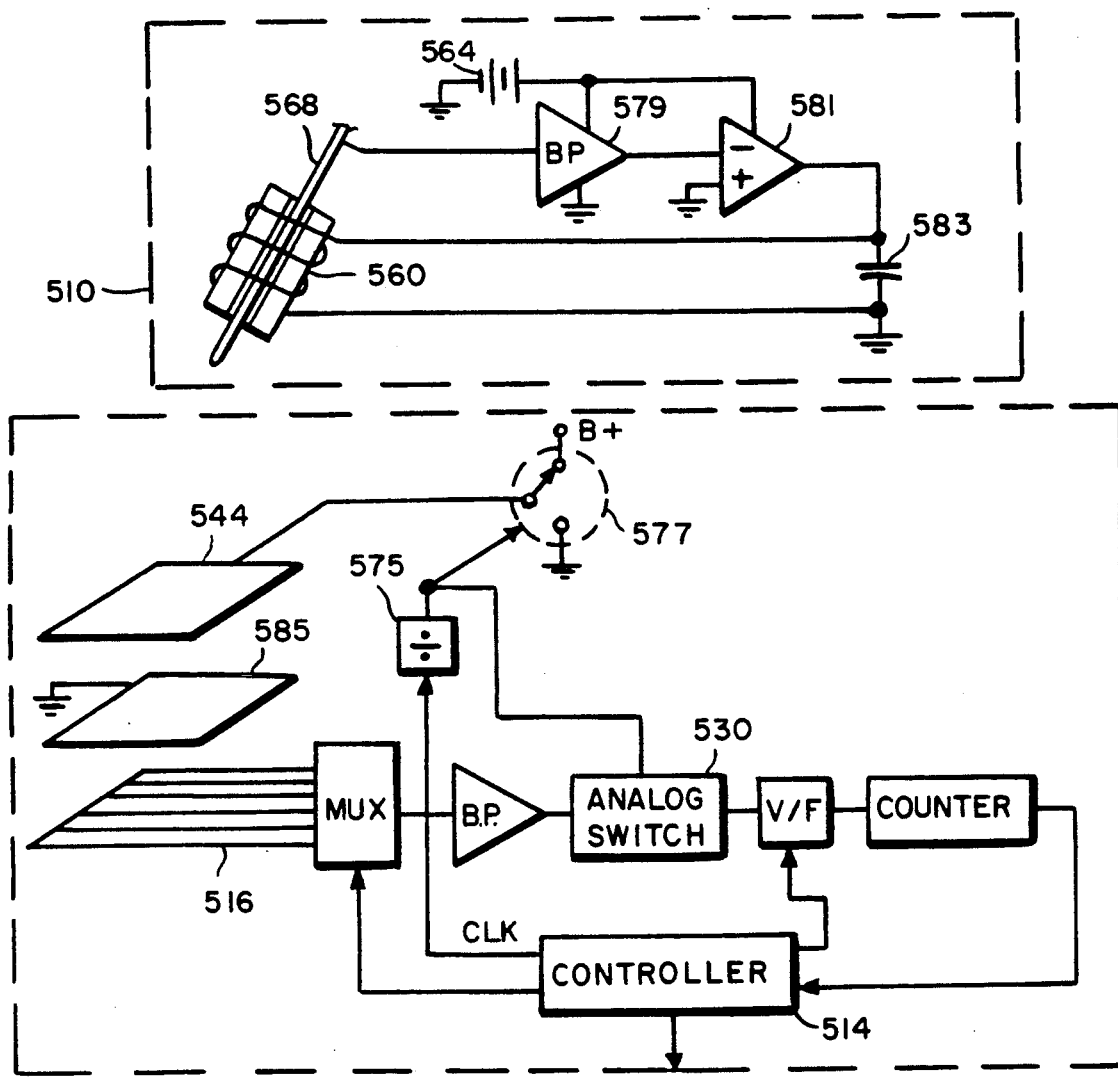
FIG. 5 is a partly block diagrammatic and partly schematic illustration of a useful alternative embodiment of the invention.

Finally, it should be realized that the invention is not limited to embodiments in which the pointer includes an oscillator. Still another alternative embodiment in which the ac signal derives from the base unit can be described with reference to FIG. 5. Within a base unit 509, a clock output from controller 514 is divided by a digital divider 575 to produce a lower frequency signal at, for example, 115 kHz. The lower frequency signal is used to drive both an electronic switch 577 and the analog switch 530 that acts as the synchronous demodulator of the induced location signal. Electronic switch 577 connects electrostatic plate 544 in the base unit's work surface alternately between supply voltage B+ and ground at the 115 kHz. rate. In the accompanying pointer 510, the stylus point 568 is connected via a bandpass amplifier 579 to the inverting input of a comparator 581; the non-inverting input of comparator 581 is connected to pointer ground. The bandpass amplifier and comparator may both be powered by a battery 564. The driving coil 560, wound around a core in the pointer, is connected in parallel with a capacitor 583 between the output of comparator 581 and pointer ground.

Figure 6:
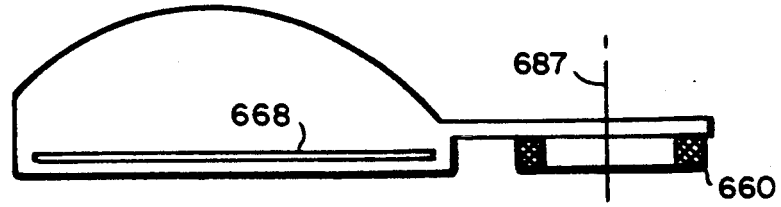
FIG. 6 is an illustration of a cursor type pointer that can be substituted for the pointer of FIG. 5.

With this arrangement, a full amplitude 115 kHz. signal is impressed on electrostatic plate 544 by switch 577. This signal is coupled electrostatically to stylus point 568 and fed to bandpass amplifier 579. Comparator 581 further amplifies the signal and centers its swing above and below ground. The resulting symmetrical 115 kHz. signal drives coil 560 to produce the electromagnetic locating signal. An electrostatic shield 585, positioned below the work surface between electrostatic sending plate 544 and electromagnetic receiving grids 516, isolates the receiving grids from the electrostatic signal. The phase information needed by analog switch 530 for synchronous demodulation of the locating signals induced in grids 516 is obtained directly from divider 575, the original source of the coil driving signal. The return path of the electrostatic circuit includes, as described in connection with FIGS. 2 and 3, pointer ground and the hand and body of the operator. Capacitor 583 may be chosen to resonate with coil 560 at the driving frequency for easy driving. The circuit of pointer 510 can also be implemented in the cursor configuration. FIG. 6 shows useful locations for an electrostatic pickup plate 668 to receive the electrostatic signal and driving coil 660. The point located by the digitizer on the work surface is, of course, on coil centerline 687.

Still other arrangements, including, for example, other driving or receiving grid configurations and other detecting arrangements will occur to those skilled in the art which do not depart from the scope and spirit of our invention, as defined by the appended claims.

We claim:

1. A graphic digitizer for digitizing locations of a pointer that is freely movable by an operator relative to a base unit, said digitizer comprising:

means for producing an ac signal of predetermined frequency;

coil means carried by said pointer and coupled to said ac signal;

a grid of spaced conductors located in said base unit and inductively coupled to said coil means;

phase reference means comprising a capacitive coupling circuit between said base unit and said pointer for producing a phase reference signal having a constant phase in relation to said ac signal; and detecting means connected to said conductors and said phase reference means for detecting signals induced in selected ones of said conductors by said coil means and for determining the location of said pointer relative to said conductors in response to said induced signals and said phase reference signal.

2. A graphic digitizer as in claim 1 wherein said capacitive coupling circuit comprises a conductive plate located in said base unit.

3. A graphic digitizer as in claim 2 wherein said phase reference means further comprises phase locked loop means connected to said conductive plate for locking to the frequency of said ac signal to produce said phase reference signal.

4. A graphic digitizer as in claim 2 wherein said capacitive coupling circuit has a coupling path that includes at least a portion of the body of said operator and said conductive plate.

5. A graphic digitizer as in claim 4 further comprising dividing means connected to said ac signal producing means for producing a second signal that is a submultiple of said ac signal, said dividing means being included in the path of said capacitive coupling circuit.

6. A graphic digitizer as in claim 5 wherein the output of said dividing means is coupled to the body of said operator.

7. A graphic digitizer as in claim 5 wherein the frequency of said second signal is one half the frequency of said ac signal.

8. A graphic digitizer as in claim 2 wherein said conductive plate is parallel to said grid of conductors.

9. A graphic digitizer as in claim 8 wherein said base unit has a work surface defining the plane of said pointer locations; and
said conductive plate is located between said grid and said work surface.

10. A graphic digitizer as in claim 8 wherein the resistivity of said conductive plate is greater than five milliohms per square.

11. A graphic digitizer as in claim 8 wherein said conductive plate comprises a coating of conductive paste.

12. A graphic digitizer as in claim 4 wherein said coil means comprises a conductive coil having a magnetic core.

13. A graphic digitizer as in claim 12 wherein said magnetic core comprises a ferrite material.

14. A graphic digitizer as in claim 12 wherein said pointer further comprises:
an elongated stylus body having an indexing end for indicating a point to be located by said digitizer and a grasping region for holding by an operator;
a metallic stylus point at said indexing end for capacitively coupling to said conductive plate; and
a conductive area at said grasping region for coupling to the hand of said operator,
said conductive area being insulated from said stylus point.

15. A graphic digitizer as in claim 14 wherein said stylus point comprises writing means.

16. A graphic digitizer as in claim 14 wherein said conductive area is insulated from and capacitively coupled to said operator's hand.

17. A graphic digitizer as in claim 14 wherein said pointer further comprises:
dividing means connected to said ac signal producing means and said conductive area for producing at said conductive area a second signal that is a submultiple of said ac signal; and
a pointer ground circuit common to said ac signal producing means, said coil means and said dividing means;
said pointer ground circuit being connected to said stylus point for coupling to said conductive plate.

18. A graphic digitizer as in claim 4 wherein said pointer further comprises:
a cursor body having a gliding surface for gliding on said base unit and an operator contact region for receiving the force of an operator's fingers to move said cursor;
a first conductive area in the vicinity of said operator contact region for coupling to the hand of said operator; and
a second conductive area in the vicinity of said gliding surface for capacitively coupling to said conductive plate.

19. A graphic digitizer as in claim 18 wherein said first conductive area is insulated from and capacitively coupled to said operator's fingers.

20. A graphic digitizer as in claim 18 wherein said pointer further comprises:
dividing means connected to said ac signal producing means and said first conductive area for producing at said first conductive area a second signal that is a submultiple of said ac signal; and
a pointer ground circuit common to said ac signal producing means, said coil means and said dividing means;
said pointer ground circuit being connected to said second conductive area for coupling to said conductive plate.

21. A graphic digitizer as in claim 2 wherein said base unit further comprises:
reference conductor means inductively coupled to said coil means for producing an electromagnetic reference signal in response to said ac signal;
analog summing means for producing the analog sum of said phase reference signal and said electromagnetic reference signal;
rectifying means for rectifying said analog sum to produce a logic signal; and
means responsive to said logic signal for selectively inverting said electromagnetic reference signal;
said detecting means determining the location of said pointer in response to said induced signals and said electromagnetic reference signal from said inverting means.

22. A graphic digitizer as in claim 21 wherein said base unit further comprises a second grid of conductors, and
said reference conductor means comprises a selected one of said second grid of conductors.

23. A graphic digitizer as in claim 22 wherein said base unit further comprises selecting means for selecting a reference conductor having an induced signal greater than a predetermined amplitude.

24. A graphic digitizer as in claim 7 wherein said phase reference means further comprises frequency doubling means coupled to said conductive plate for producing said phase reference signal.

25. A graphic digitizer as in claim 1 wherein said means for producing an ac signal comprises an oscillator.

26. A graphic digitizer as in claim 25 wherein said oscillator is carried by said pointer.

27. A graphic digitizer as in claim 25 wherein said oscillator is included in said base unit.

28. A graphic digitizer as in claim 1 wherein said means for producing an ac signal comprises amplifying means connected to said capacitive coupling circuit; and
said phase reference means further comprises clock means for producing said phase reference signal.

29. A graphic digitizer as in claim 4 wherein said means for producing an ac signal comprises amplifying means connected to said capacitive coupling circuit; and said phase reference means further comprises clock means for producing said phase reference signal.

30. A graphic digitizer as in claim 29 wherein said base unit further comprises electrostatic shield means located between said grid and said conductive plate.

31. A graphic digitizer for digitizing locations of a pointer that is freely moveable relative to a base unit, said digitizer comprising:
coil means carried by said pointer;
a grid of spaced conductors located in said base unit;
means for inductively coupling locating signals between said coil means and selected conductors of said grid;
means for capacitively coupling a reference signal between said pointer and said base unit; and
detecting means responsive to said inductively coupled locating signals and said capacitively coupled reference signal for determining the location of said pointer relative to said grid.

32. A graphic digitizer as in claim 31 wherein said pointer further includes an oscillator for producing an ac signal for driving said coil means.

33. A graphic digitizer as in claim 32 wherein said capacitive coupling means comprises a conductive plate formed in said base unit parallel to said grid.

34. A graphic digitizer as in claims 33 wherein said base unit further includes phase locked loop means capacitively coupled to said conductive plate to provide said reference signal having a constant phase in relation to said ac signal.

35. A graphic digitizer as in claim 31 further including:
means for inductively coupling an electromagnetic reference signal between said coil means and a selected reference conductor of said grid; and
means for combining said electromagnetic reference signal with said capacitively coupled reference signal to produce a composite reference signal; and
wherein said detecting means is responsive to said inductively coupled locating signals and said composite reference signal for determining the location of said pointer relative to said grid.

36. A graphic digitizer as in claim 31 wherein said base unit further includes an oscillator for capacitively coupling an ac signal to said coil means in said pointer for driving said coil means.

* * * * *